United States Patent
Fellows et al.

(10) Patent No.: US 12,536,032 B2
(45) Date of Patent: *Jan. 27, 2026

(54) PIPELINE FOR PROCESSING TRANSACTIONS

(71) Applicant: Capital One Services, LLC, McLean, VA (US)

(72) Inventors: Matthew Fellows, San Francisco, CA (US); Annette Chen, Boston, MA (US); Leandra Irvine, San Jose, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/655,004

(22) Filed: May 3, 2024

(65) Prior Publication Data

US 2024/0362060 A1  Oct. 31, 2024

Related U.S. Application Data

(63) Continuation of application No. 16/679,804, filed on Nov. 11, 2019, now Pat. No. 11,977,912.

(51) Int. Cl.
*G06F 9/46* (2006.01)
*G06F 9/30* (2018.01)
*G06F 9/54* (2006.01)

(52) U.S. Cl.
CPC .......... *G06F 9/466* (2013.01); *G06F 9/30094* (2013.01); *G06F 9/544* (2013.01)

(58) Field of Classification Search
CPC ....... G06F 9/466; G06F 9/30094; G06F 9/544
USPC ......................................................... 712/220
See application file for complete search history.

(56) References Cited

U.S. PATENT DOCUMENTS

| | | | |
|---|---|---|---|
| 6,715,145 B1 | 3/2004 | Bowman-Amuah | |
| 6,925,468 B1 | 8/2005 | Bobbitt et al. | |
| 7,181,422 B1 | 2/2007 | Philip et al. | |
| 7,778,899 B2 * | 8/2010 | Scumniotales | G06Q 10/10 705/35 |
| 7,912,842 B1 | 3/2011 | Bayliss | |
| 7,921,046 B2 | 4/2011 | Parsons et al. | |
| 2014/0129314 A1 * | 5/2014 | Kim | G06Q 30/0233 705/14.33 |
| 2014/0239066 A1 * | 8/2014 | Dessert | G06Q 30/0601 235/383 |
| 2014/0278905 A1 * | 9/2014 | DeNardis | G06Q 20/401 705/14.38 |
| 2018/0293573 A1 * | 10/2018 | Ortiz | G06Q 20/20 |
| 2018/0293673 A1 | 10/2018 | Ortiz Obando | |

FOREIGN PATENT DOCUMENTS

| | | |
|---|---|---|
| CN | 103514565 A | 1/2014 |
| JP | 5814329 B2 | 11/2015 |

\* cited by examiner

*Primary Examiner* — Hai Tran
(74) *Attorney, Agent, or Firm* — Greenberg Traurig, LLP

(57) ABSTRACT

A banking pipeline for processing various transactions for multiple financial instruments is disclosed herein. The pipeline may have three distinct interpreters, a transaction interpreter, a rollup interpreter, and a rules interpreter. Different aspects of the transaction may be performed on separate interpreters and each interpreter may perform its aspect of the transaction before the next interpreter begins.

20 Claims, 5 Drawing Sheets

PIPELINE FOR PROCESSING TRANSACTIONS

BACKGROUND

1. Technical Field

The present disclosure relates to a pipeline for processing electronic transactions using distinct interpreters and processing steps.

2. Introduction

Transactions for different types of instruments can be complex inter-related, and specific to the product. However, it is inefficient for the institutions that process these transactions and provide these instruments to use separate systems and software programs for each instrument. It is advantageous to have a single system that is adaptable and programmable to process each of the possible transactions available for multiple products. Processing different products on different systems and using different methods can create inconsistencies between interrelated transactions. Additionally, new products cannot be programmed to work on a single universal system for the institution.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media a technical solution to the technical problem described. A system configured to perform the concepts disclosed herein may comprise: a receiver that receives a location of an instrument in a database and a first transaction and retrieves a term of the instrument and a first state of the instrument from the location on the database, wherein the first state of the instrument includes an instrument balance; a transaction interpreter that receives the first transaction, the term of the instrument, and the first state of the instrument from the receiver, wherein the transaction interpreter performs the first transaction on the instrument balance based on the term of the instrument and generates a second state of the instrument that reflects a performance of the first transaction; a rollup interpreter that receives the second state of the instrument and the term of the instrument from the transaction interpreter, wherein the rollup interpreter adjusts the instrument balance based on a value identified by the term of the instrument and generates a third state of the instrument; and a rules interpreter that receives the first state of the instrument, the third state of the instrument, and the term of the instrument from the rollup interpreter, wherein the rules interpreter: identifies a rule within the term of the instrument; generates a second transaction based on the rule and sends the second transaction, the third state of the instrument, and the term of the instrument to the transaction interpreter when the rule indicates that further processing is warranted based on the first state of the instrument and the third state of the instrument; and commits the third state of the instrument to the database when the rules indicate that further processing is not needed based on the first state of the instrument and the third state of the instrument.

A method configured to perform the concepts described herein may comprise: receiving a contract identifier that identifies an instrument and a first transaction to be performed on the instrument; retrieving from a database a term of the instrument and a first state of the instrument based on the contract identifier, wherein the first state of the instrument includes a value of the instrument; sending the first transaction, the term of the instrument, and the first state of the instrument to a transaction interpreter determining how the first transaction should be applied to the first state of the instrument based on the terms of the instrument in the transaction interpreter; and applying the first transaction to the value of the instrument to generate a second state of the instrument in the transaction interpreter; receiving the second state of the instrument and the term of the instrument in a rollup interpreter, wherein the rollup interpreter applies the value of the instrument to other values identified by the terms of the instrument to generate a third state of the instrument; and receiving the first state of the instrument, the third state of the instrument, and the term of the instrument in a rules interpreter, wherein the rules interpreter: identifying a rule of the instrument in the rules interpreter; generating in the rules interpreter a second transaction based on the rule and sends the second transaction, the third state of the instrument, and the term of the instrument to the transaction interpreter when the rule indicate that an additional transaction is warranted based on the first state of the instrument and the third state of the instrument; and committing in the rules interpreter the third state of the instrument to the database when the rules indicate that the additional transaction is warranted based on the first state of the instrument and the third state of the instrument.

A computer-readable storage medium configured as disclosed herein may store instructions which, when executed by a computing device, causes the computing device to perform a method comprising: receiving a set of transactions for an instrument; retrieving a term of the instrument and a state of the instrument from a database, wherein the state of the instrument includes current properties of the instrument; applying in a transaction interpreter the set of transactions to the current properties of the instrument per the terms of the instrument to generate a second state of the instrument having altered properties; aggregating in an rollup interpreter the altered properties of the second state of the instrument to create a third state of the instrument having an aggregated property; applying rules of the instrument to the current properties and the aggregated property to determine if further processing is desired in a rules interpreter; generating an additional transaction in the rules interpreter when further processing is desired and returning the aggregated property and the additional transaction to the transactions interpreter; and committing the aggregated property to the database when further processing is not desired.

DETAILED DESCRIPTION

Figure 1:
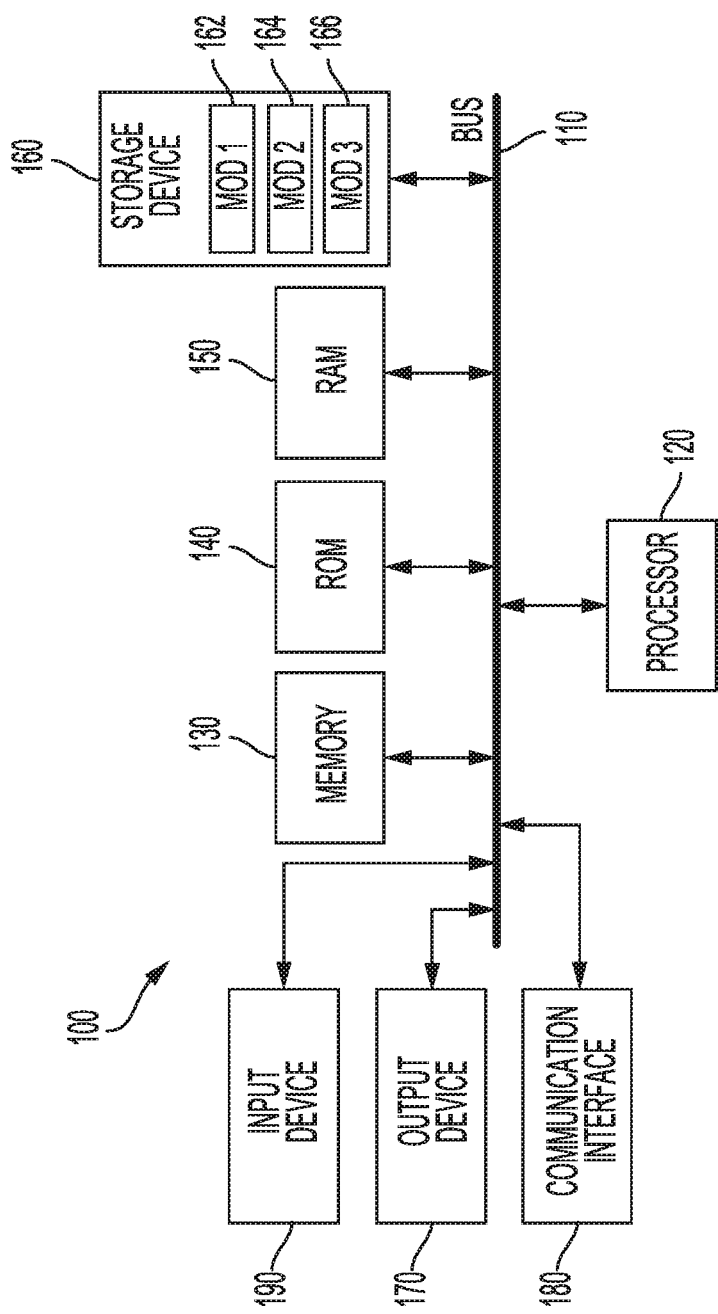
FIG. 1 illustrates a first example system embodiment.

Various embodiments of the disclosure are described in detail below. While specific implementations are described, it should be understood that this is done for illustration purposes only. Other components and configurations may be used without parting from the spirit and scope of the disclosure.

Various embodiments of the present disclosure are directed to methods, systems, and non-transitory computer-readable media for transaction processing in a processing core. These transactions may be processed on a core that is housed by an institution that provides client instruments. The core may include a computer system that is programmed to process and store various transactions, configurations, and states of the instrument. In an embodiment the core may receive a transaction from a customer by way of a contract ID, which may identify the financial instrument that was used or affected by the transaction. The contract ID may provide information that allows a database to retrieve information about the instrument from the system. That instrument may include values of the instrument and the instrument configuration.

After the configuration is received, it may be sent or transmitted to a transaction interpreter on the core. The transaction interpreter may process the transaction and change the state of the instrument by updating the instrument values that are affected by the transaction. The updated values may be associated with the instrument and a database updated to store the new data. The transaction interpreter may be configured to perform the arithmetic operations resulting from the transaction. For example, if the transaction is the payment on a loan, it may put the amount of the payment in the principle paid bucket and remove it from the principle due bucket. A bucket may just be a repository for transactions having similar conditions. In an embodiment, a benefit provided to the account may be associated with a separate section or "bucket" to the account. For example, monetary credits or points may be placed in a credit or points bucket. The points may be redeemed for airline frequent flyer miles, for example, or may be redeemed for other products or services.

Similar instruments may also effectuate other double entries. In other embodiments, the transaction may be that no payment was made on a given date and the transaction interpreter may set a delinquent flag, changing the state of the instrument. In this embodiment, the transaction may be initiated by the system and not the customer.

After the transaction is processed, the state may be changed and the instrument, the changed state, and the configuration and/or rules may be sent or transmitted to a rollup interpreter. If there are multiple transactions, they may all be processed before anything is output by the transaction interpreter and received by the rollup interpreter. The rollup interpreter may be configured to perform any aggregations for the instrument. The appropriate aggregations may be indicated in the instrument configuration or terms. For example, if the transaction was a credit card payment, the transaction interpreter may have changed the state of the instrument by moving the payment from the principle due bucket to the principle paid bucket. In this example, the rollup interpreter may aggregate the principle due bucket and the principle paid bucket to calculate the aggregate principle. In other examples, the rollup interpreter may aggregate a balance with any interest incurred on the instrument or fees resulting from the transaction. The output from the rollup interpreter may be a further updated state. The updated state may then be output as a data structure and associated with the instrument, the configuration, terms and/or rules to a rules interpreter.

A rules interpreter may receive the updated state, the instrument, the terms, and/or rules from the rollup interpreter. The rules interpreter may use the terms of the instrument and/or rules located on a memory system to determine what rules apply to the transaction and/or instrument based on the state of the instrument. For example, the rules interpreter may determine that a reward is warranted based on a change in the state of the instrument. The rules interpreter may then determine the appropriate amount to add to a reward bucket and may output the state of the instrument, the configuration of the instrument, the terms and/or rules of the instrument, and the new transaction that was created by the reward or application of the rule. In some embodiments, the rules interpreter may output multiple transactions for the instrument based on the rules. The output from the rules interpreter may be sent to the transaction interpreter if there are additional transactions. If there are no additional transactions, the rules interpreter may output the state of the instrument to the database. The database may commit the new state to memory and the process may end. The process may cycle through the transaction interpreter, the rollup interpreter, and the rules interpreter, until the rules interpreter determines that there are no more transactions to be processed by the transaction interpreter, it may then output the final state to the database.

In one example, institutions offer customers a number of instruments that may be financial. For example, debt accounts, checking accounts, credit cards, loans, and mortgages. Each of these accounts allow customers to make a number of transactions, such as transfers, purchases, withdrawals, and payments. However, depending on the configuration of a financial instrument, the way that these transactions are processed may be very different. For example, some financial instruments may incur interest for the customer or for the bank. Others may offer incentives for using the account or for making payments to the accounts. Others may be affected by the date that the transactions are made, for example, if a payment is made by a predetermined date a fee may be waived.

The financial instruments of a single financial institution may be stored on a banking core database which may also store the configuration of the instrument that contains the state of the instrument. The state of the instrument may include values such as the balance of the financial instrument, the fees incurred for the financial instrument, the interest incurred on the financial instrument, the available balance of the financial instrument, or the principle paid on the financial instrument.

The configuration of the financial instrument may further include things such as how a payment is to be applied to a financial instrument or what values are affected by making a transaction using a financial instrument. For example, if a purchase is made using a debit card instrument the configuration may indicate that the cost of the purchase should be deducted from the balance of the financial instrument. If a cash withdrawal is made from a checking account at an ATM, the instrument may be configured to deduct the withdrawn amount from the balance of the financial instrument and add an ATM fee to the balance of a financial instrument. A credit card financial instrument may be configured to deduct the amount of the purchase from the principle paid on the financial instrument and add the amount of the purchase to the principle due on the financial instrument. It may be further configured to accumulate interest on the financial instrument, add a fee to the financial instrument, or add a reward to a reward balance of a financial instrument. Although the transaction, rollup, or rules interpreter are described as functionally separate for clarity, they may be combined, or partially combined, together.

With reference to FIG. 1, an exemplary system includes a general-purpose computing device 100, including a processing unit (CPU or processor) 120 and a system bus 110 that couples various system components including the system memory 130 such as read-only memory (ROM) 140 and random access memory (RAM) 150 to the processor 120. The computing device 100 can include a cache of high-speed memory connected directly with, in close proximity to, or integrated as part of the processor 120. The computing device 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, system bus 110, an output device 170 that might be a display, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 100 is a small, handheld computing device, a desktop computer, or a computer server.

Although the exemplary embodiment described herein employs the storage devices 160 that may be a hard disk, other types of computer-readable media which can store data that are accessible by a computer, such as magnetic cassettes, flash memory cards, digital versatile disks, cartridges, random access memories (RAMs) 150, and read-only memory (ROM) 140, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

Figure 2:
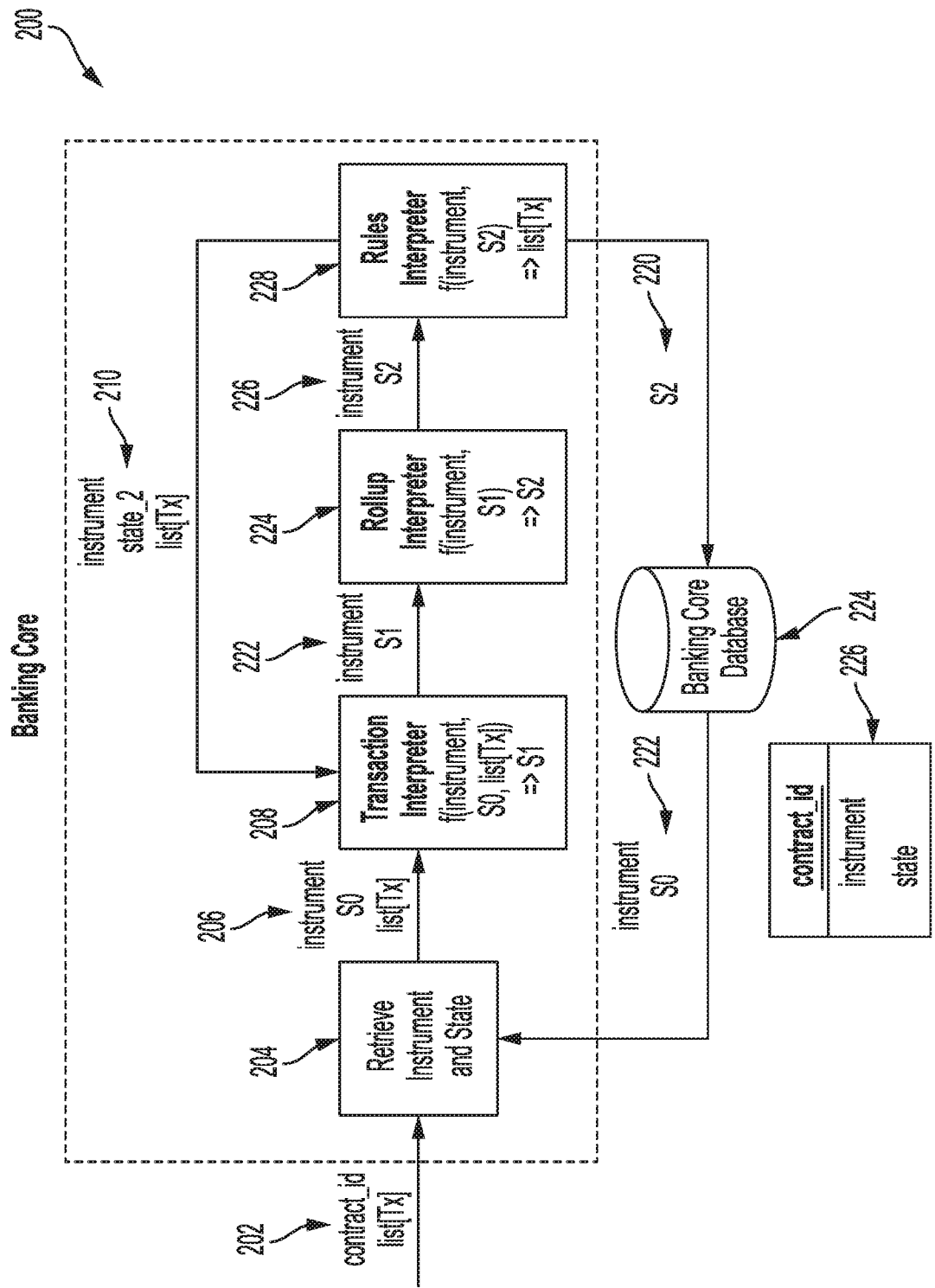
FIG. 2 illustrates a second example system embodiment.

FIG. 2 illustrates an example system embodiment of a banking core 200. A contract ID 202 may be provided by a customer or initiated by another system. The contract ID 202 may include information identifying the instrument and include one or more transactions Tx to be processed. The retriever 204 retrieves the contract ID 202 including the one or more transactions Tx and retrieves the information regarding the instrument from a banking core database 224. The database may find the instrument based on an identifying factor within the contract ID 202 or the contract ID 202 may indicate the location of the instrument on the banking core database 224. The information about the instrument may contain a configuration of the instrument, rules of the instrument, or terms of the instrument. The contract ID 202 may also point to a state of instrument. The state of the instrument may be specific to the individual account and may contain values, flag states, or balances which may be stored in various buckets.

The instrument and state may be stored at a single location on the database or different parts of the instrument may be stored at different locations of the database. For example, if the instrument is a type of credit card, the configuration of that type of credit card may be stored at one location and may be identified by the contract ID 202 in all transactions that implicate that type of credit card. The details of the individual account may be stored at a different location for that individual customer. The details may include the balance, principle, or fees for that particular account. This arrangement may avoid duplicative entries on the database for characteristics that are shared by multiple financial instruments. The instrument state 222 ($S_0$) may be returned to the retriever. In other embodiments the instrument and state 222 ($S_0$) may be received in separate pieces and combined in the retriever 204 into a distinct unit.

At 206 the retrieved instrument and state 222 and the transaction Tx may be sent to the transaction interpreter 208. The transaction may also have an identifier that identifies the type of transaction, i.e. payment, purchase, missed payment and a value of the transaction, for example the amount of money. The transaction interpreter may the search the instrument to determine how that type of payment is to be processed. For example, if the instrument is a credit card and the transaction is a purchase, the transaction interpreter may search the instrument for instructions on how to process payments. The instruction may be within the configuration of the instrument. The configuration of the instrument may be a JSON object. The instructions for purchases may be to move the amount from a bucket containing the principle paid and add it to the principle due in a double entry. This may change the state of the instrument $S_0$ to a new state $S_1$ that reflects the transaction: a purchase. If there are additional transactions, for example another purchase or an award received, this may be completed in the transaction interpreter before the instrument and state $S_1$, may be sent to a rollup interpreter. The rollup interpreter may perform any necessary aggregations. In the above example the configuration may contain instructions to aggregate the principle paid and the principle due and output the aggregate principle. If there are multiple transactions, the rollup interpreter may aggregate all of the transactions performed in the transaction interpreter to determine the aggregated state of the instrument which may be $S_2$. The instrument and $S_2$ may then be sent to the rules interpreter 228 after all of the necessary aggregations have been processed at 226.

The instrument may contain rules or may identify applicable rules that may be saved on a banking core database 224. The rules interpreter 228 may apply the rules based on the information contained in the state $S_2$. In some embodiments, the rules interpreter 228 may also receive state $S_0$ and may apply rules based on a difference between the state $S_0$ and $S_2$. For example, the instrument may have a rule that adds 1% of the purchase to an awards account. If there is a rule that requires making changes to the state of the instrument, then the rules interpreter 228 may output the new transaction to be applied to the instrument. If there are no additional transactions, the rules interpreter 228 may commit the state of the instrument $S_2$ to banking core database 224 at 220. If there is an additional transaction, such as adding the rewards to a rewards value of the instrument, the rules interpreter 228 may send the state of the instrument $S_2$ and the new transaction to the transaction interpreter 208. In the transaction interpreter 208 the rewards may be added to the rewards account, beginning the process again from the transaction interpreter 208 step. This may continue until there are no more transactions identified by the rules interpreter 228 and the final state may then be committed to the banking core database 224.

Figure 3:
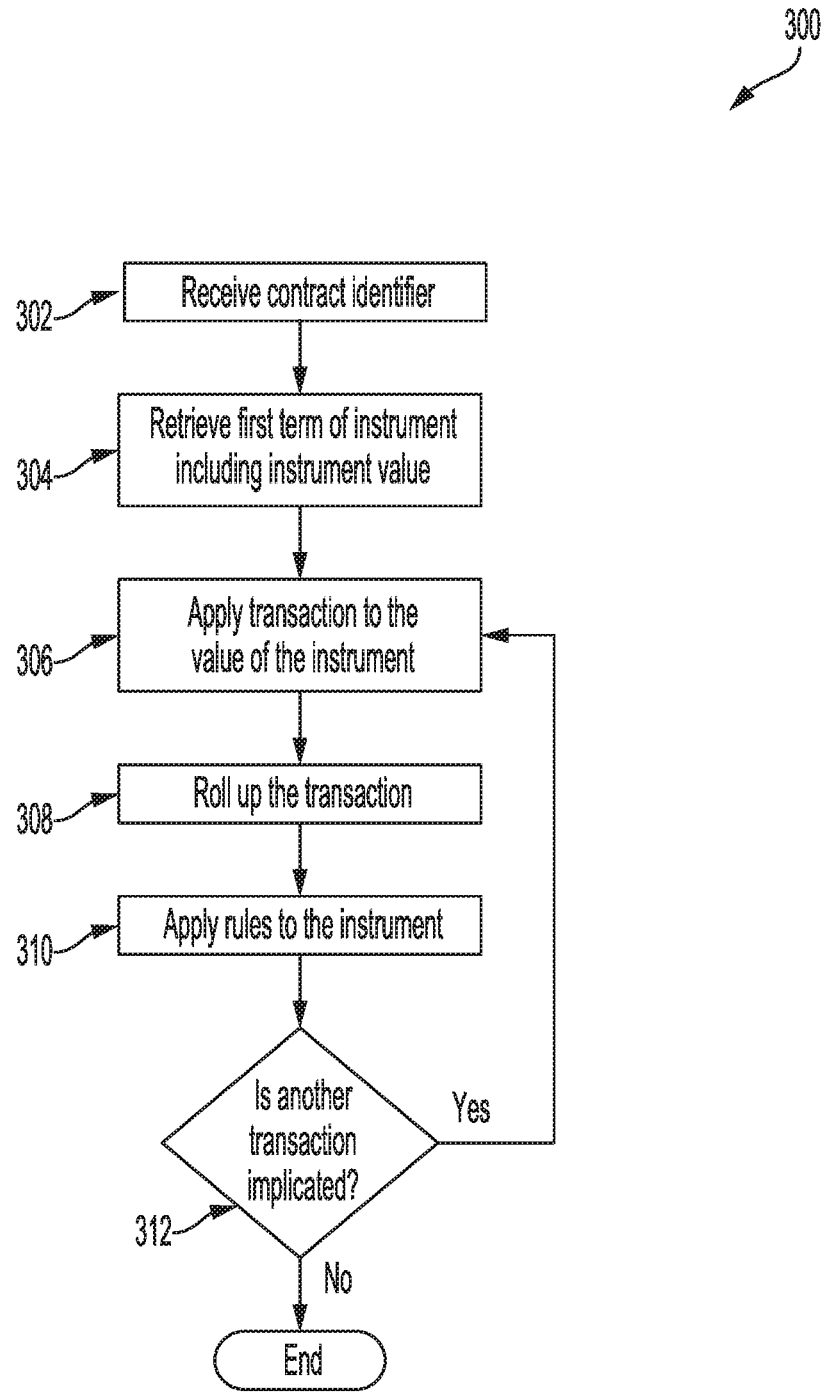
FIG. 3 illustrates a third example method embodiment.

FIG. 3 shows an example method 300. At 302 a contract identifier may be received which indicates which instrument to apply a transaction to. At 304, a term of the instrument is retrieved from a database. The value of the instrument, which may also be described as the state of the instrument, may initially be $S_0$. The term may be specific to the type of transaction. For example, if the transaction is a late payment flag, the term retrieved may indicate that a fee may be added to the balance, changing the state of the account. The value may be the amount in the balance of an account or the state of the account as not delinquent. The late payment flag may be indicated by a delinquent flag of the instrument being sent to 0. In the next step 306 the transaction may be applied to the value of the instrument. This may occur in the transaction interpreter. If the transaction is a fee, the transaction may be applied by setting a delinquent flag from 0 to 1 or from off to on. After the transaction is processed, the output may be an updated state $S_1$. The value and the term may then be rolled up in the next step 308. In a fee embodiment, there may be no additional rollup indicated. Though value may not change, the value may still be considered to be a state $S_2$. The value and the term or contract identifier may then be reviewed to determine whether the rules indicate that any additional transactions should be performed on the instrument at 310. In this example, the term of the instrument may indicate that a fee should be added to the value or balance of the account at 312. If an additional transaction is needed, the transaction may be output and the transaction and state of the instrument may then be processed at 306. Any information that was initially sent to the transaction interpreter at 304 may be included in the information sent to the transaction interpreter at 312. In some embodiments, the state sent from the rollup interpreter may be considered to be back in a state $S_0$, though the values of properties of the state may be different from the $S_0$ sent at 304. In this way the transaction interpreter may not handle a transaction for from a rollup interpreter at 312 in the same way as a transaction coming from the retriever at 304.

For example, if the transaction is a fee, the transaction interpreter may add the fee to the balance at 306 and the state of the transaction may again change to state $S_1$. The changed state and the term of the instrument may again be passed to the rollup interpreter. This cycle may continue until there are no additional transactions implicated at 312. If there are no transactions implicated, the process may end. In some embodiments, the value or state from 312 may be committed to a database at this point.

Figure 4:
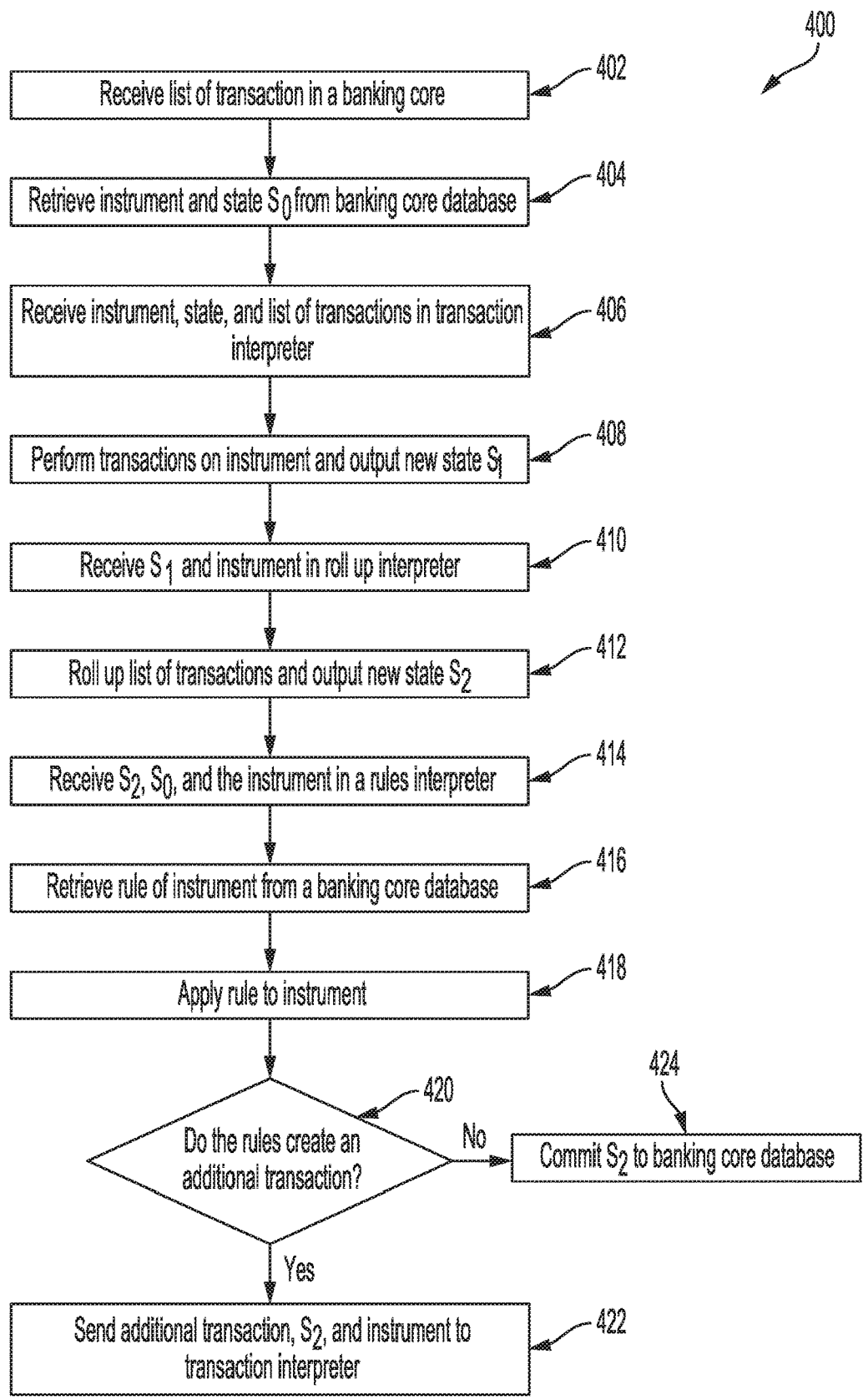
FIG. 4 illustrates a fourth example method embodiment.

FIG. 4 is an exemplary method 400. At 402, a list of transactions may be received in a transaction core. At 404, the instrument and the state of the instrument $S_0$ may be retrieved by a transaction core database. The state of the instrument $S_0$ may include a number of values that may include the different balances related to the instrument or on off flags indicating information about the instrument. The instrument may contain a configuration that, when interpreted by a computer program, controls how the state of the instrument is to be handled when transactions occur. At 406 the instrument, state $S_0$, and the list of transactions may be received in a transaction interpreter. The transaction interpreter may interpret the configuration of the instrument as a function of the received transaction. The instrument and/or the configuration may be in the form of a programmable object, such as a JSON object.

At 408 the transaction is performed on the state $S_0$. This may be done by identifying the type and amount of the transaction and adjusting the state $S_0$ based on the configuration and the instructions for processing the transaction type on that instrument. All of the transactions in the list may be performed at step 408 before moving to step 410. The final state after the transaction are performed may be $S_1$. At step 410, $S_1$ and the instrument may be received by a rollup interpreter. The instrument configuration may contain a list of aggregations to be performed on the new state of the instrument $S_1$ in a rollup interpreter at 412. After the aggregations are performed the new state may be $S_2$. Some transactions may not require any aggregations and $S_1$ may be the same as $S_2$. At 414 the states $S_0$ and $S_2$, and the instrument may be sent to a rules interpreter. The rules interpreter may extract the rules from the instrument. In other embodiments the rules may be retrieved from a separate database. The instrument may indicate what rules to retrieve from a banking core database at 416. At 418, if it is determined that rules apply to the instrument, the rules may be applied to the instrument. The rules interpreter that may then output one or more transactions. In some embodiments, whether a rule applies may be determined by comparing state $S_0$ and $S_2$. At 420 it may be determined whether the rules interpreter outputs an additional transaction. If there are additional transactions the list of additional transactions, the instrument, and the state $S_2$ may be sent back to the transaction interpreter at 406. If $S_2$ is sent to the transaction interpreter, it may be understood to be the first state $S_0$. This may continue until the no additional transactions are created by the rules interpreter as determined at 420. If it is determined at 420 that there are no additional transactions, the state $S_2$ may be committed to the banking core database at 424.

Figure 5:
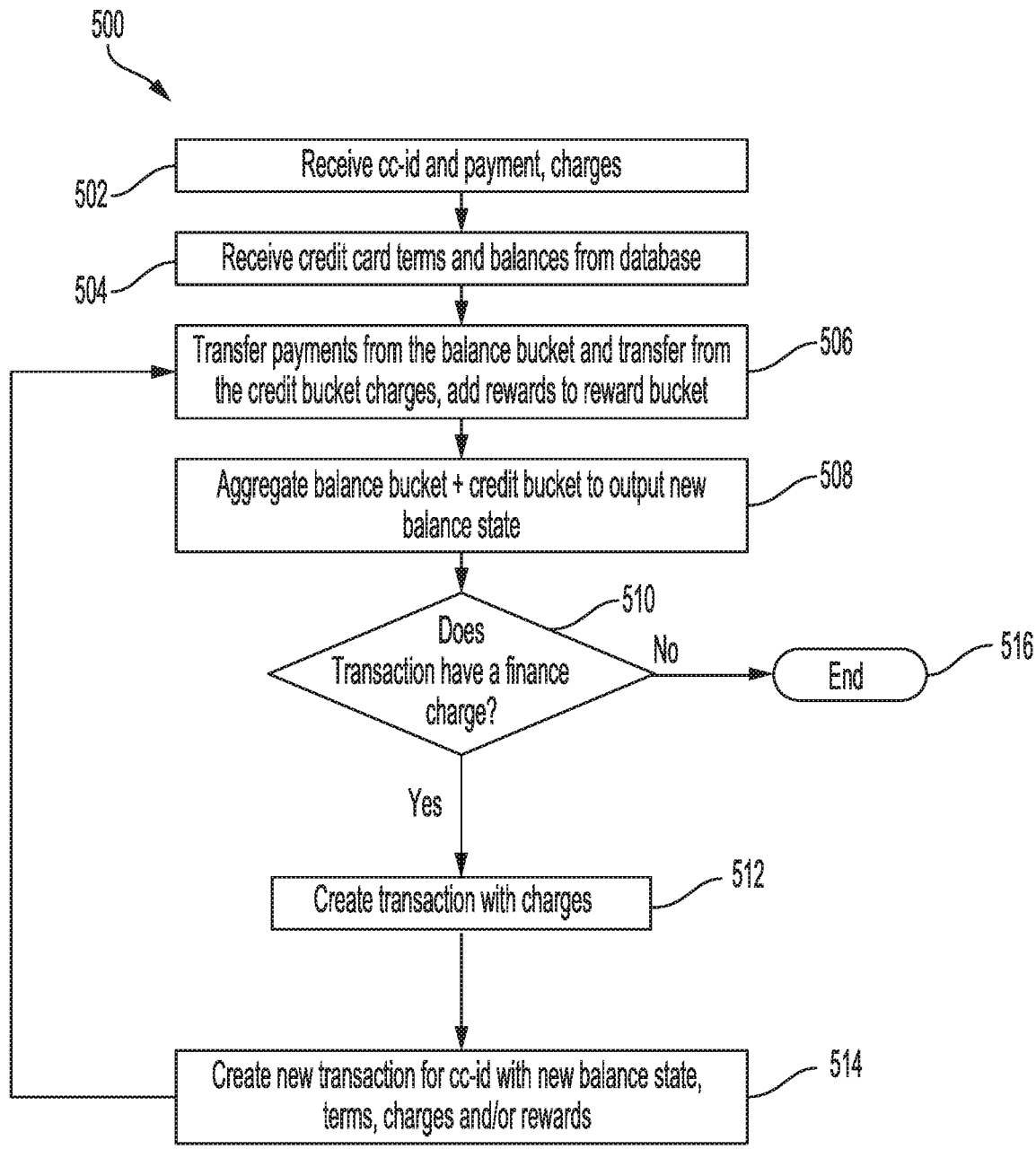
FIG. 5 illustrates a fifth example method embodiment.

FIG. 5 is an exemplary method embodiment 500. At 502 the method may receive an account identifier which may be a credit card ID (cc-id). In other embodiments, the account identifier may identify another type of account, such as a loan, mortgage, or any other type of account. It may also receive a charge or payment that has been made by the financial instrument associated with the account identifier or cc-id. For example, the transaction for the credit card may be a $100 payment and a $50 charge. At 504 the terms of the instrument, a credit card in this example, as well as terms and balances related to the credit card may be retrieved. For example, the state of the instrument which may include information indicating that the credit card has a $500 balance, a $1000 available credit, and an awards points balance of 20 may be retrieved. The terms of the instrument which may indicate that the instrument has a 2% finance charge and credits an award point for every $10 spent on the credit card may be retrieved. The different balances of the account may be maintained in financial buckets.

At a step 506, the value of the financial buckets may be changed to reflect these changes. This may occur in a transaction interpreter. In the above example instrument, $100 may be deducted from the balance, $50 may be added to the balance, $100 may be added to the available credit, $50 may be deducted from the balance. The instrument may also instruct the transaction interpreter to add 5 rewards points to the new rewards bucket for the $50 purchase. It may also set a finance charge flag to 1, reflecting that a finance charge has not been processed for this transaction. Terms specifying how the transaction is to be processed may be retrieved at 504. Thus the output from 506 may include a balance of $450, an available credit of $1050, and 5 awards points.

At 508, the available credit and the balance may be aggregated to calculate the principle balance. This may occur in a rollup interpreter. The appropriate aggregations may also be included in the terms of the instrument. For example, if the rollup interpreter is instructed to aggregate the principle of the loan the output from the rollup interpreter may include aggregate principle $1500. It may also aggregate the 5 rewards points with the total amount of rewards points currently in the account and it may also output 25 rewards points. The state of the instrument may be updated to include these aggregations.

At 510, the rules interpreter may retrieve rules of the instrument. If the instrument has a rule that applies at 510, a new transaction required by the rule may be created at 512. For example, the instrument may have a rule that requires the instrument to calculate a finance charge when a finance charge flag is set to 1. In the above example, three transactions may be created: 1) calculate 2% of the aggregate principle 2) add the calculated amount to the balance and 3) set the finance charge flag to 0. In other embodiments it may determine whether the instrument has awards.

At 514 the transactions may be combined with the state of the instrument, the previous payments and charges, terms, cc-id, or any other information of the instrument in a form that can be interpreted by the transaction interpreter. The process may then return to 506 to perform these transactions. In the above example, $30, which is the 2% finance charge on the aggregate principle of $1500 finance charge, may be calculated in the first transaction interpreted at 506. At 508, $30 may be added to the balance in the second transaction interpreter so that the balance of $450 becomes $480. A finance charge flag may be set to 0 so that the rules interpreter does not re-calculate the finance charge at 512. The instrument state may then be updated to reflect the transaction and this may be sent to the rollup interpreter at 508.

The rollup interpreter may then perform any of the necessary aggregations at 508. In this example the rollup interpreter may calculate a new aggregate principle by aggregating the new balance and the available credit so that the updated state reflects an aggregate principle of $1530. The new state may be sent to the rules interpreter at 510.

At 510 the rules interpreter may receive the new state and determine that the finance charge is set to 0. It may determine that no other transactions are necessary and end the process at 516. This may include committing the updated state of the instrument to a database.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

The invention claimed is:
1. A system comprising:
a processor coupled to a memory that includes instructions that, when executed by the processor, cause the processor to:
identify an instrument remotely associated with the processor from a pipeline of data received by the processor;
receive, from at least one database computing device, a data structure associated with the instrument, the data structure comprising a first state of the instrument and a first and a second data entry associated with the instrument, wherein the first state of the instrument comprises a term of the instrument, wherein the first state is stored in a database memory of the at least one database computing device;
execute a transaction interpreter, by inputting, from the at least one database computing device, the data structure into the transaction interpreter;
determine, by executing the transaction interpreter, a transaction type of the instrument;
alter, by executing the transaction interpreter, the first state of the instrument to a second state of the instrument in the data structure based at least on one of the transaction type or the term;

execute a rollup interpreter, by inputting the data structure into the rollup interpreter, the data structure comprising the second state of the instrument;

aggregate, by executing the rollup interpreter, the first and the second data entry of the data structure to create a third state of the instrument;

alter, by executing the rollup interpreter, the second state of the instrument to the third state of the instrument in the data structure;

execute a rule interpreter, by inputting the data structure into the rule interpreter, the data structure comprising the third state of the instrument;

identify, by executing the rule interpreter, a rule based on the term of the instrument;

apply, by executing the rule interpreter, the rule on the third state of the instrument to create a fourth state of the instrument in the data structure; and send, to the at least one database computing device, the data structure comprising the fourth state of the instrument.

2. The system of claim 1, wherein the rule interpreter further compares the first state of the instrument to the third state of the instrument and determines that further processing is unwarranted based on the comparison.

3. The system of claim 1, wherein the data further causes the at least one database computing device to alter the state information associated with the instrument such that the first state of the instrument is altered or updated to include information associated with the third state of the instrument.

4. The system of claim 1, wherein the term comprises at least one of a configuration of the instrument or data related to how to apply the transaction to the instrument.

5. The system of claim 1, wherein the instructions further cause the processor to invoke the transaction interpreter to process multiple additional transactions.

6. The system of claim 5, wherein the transaction interpreter performs the multiple additional transactions.

7. The system of claim 1, wherein the first state of the instrument further comprises an original balance of the instrument, and wherein the original balance includes a principle due and a principle paid.

8. The system of claim 1, wherein the transaction comprises setting a flag.

9. The system of claim 1, wherein the first state of the instrument further comprises an original balance of the instrument, and wherein the transaction comprises increasing or decreasing the original balance.

10. The system of claim 1, wherein the term is retrieved from the at least one database computing device when a separate transaction is received relating to a separate instrument.

11. A non-transitory computer-readable medium having stored thereon instructions that are executable by a processor to cause a system to perform operations comprising:

identifying an instrument remotely associated with the processor from a pipeline of data received by the processor;

receiving, from at least one database computing device, a data structure associated with the instrument, the data structure comprising a first state of the instrument and a first and a second data entry associated with the instrument, wherein the first state of the instrument comprises a term of the instrument, wherein the first state is stored in a database memory of the at least one database computing device;

executing a transaction interpreter, by inputting the data structure into the transaction interpreter;

determining, by executing the transaction interpreter, a transaction type of the instrument;

altering, by executing the transaction interpreter, the first state of the instrument to a second state of the instrument in the data structure based at least on one of the transaction type or the term;

executing a rollup interpreter, by inputting the data structure into the rollup interpreter, the data structure comprising the second state of the instrument;

aggregating, by executing the rollup interpreter, a first and a second entry of the data structure to create a third state of the instrument;

altering, by executing the rollup interpreter, the second state of the instrument to the third state of the instrument in the data structure;

executing a rule interpreter, by inputting the data structure into the rule interpreter, the data structure comprising the third state of the instrument;

identifying, by executing the rule interpreter, a rule based on the term of the instrument;

applying, by executing the rule interpreter, the rule on the third state of the instrument to create a fourth state in the data structure; and sending, to the at least one database computing device, the data structure comprising the fourth state of the instrument.

12. The non-transitory computer-readable medium of claim 11, wherein the second state reflects performance of the transaction and reflects an update of an original balance associated with the instrument to a second balance of the instrument after the performance of the transaction.

13. The non-transitory computer-readable medium of claim 11, wherein the operations further comprise generating an aggregate principle in the rollup interpreter.

14. The non-transitory computer-readable medium of claim 11, wherein the rule is selected based on a difference between the first state and the second state.

15. The non-transitory computer-readable medium of claim 11, wherein the operations further comprise setting a flag within a state of the instrument via the transaction interpreter, wherein the rule identifies, based on the flag, if an additional recalculation is warranted.

16. The non-transitory computer-readable medium of claim 11, wherein the operations further comprise recording the transaction at least twice in the at least one database computing device when the transaction comprises a double entry.

17. The non-transitory computer-readable medium of claim 11, wherein the operations further comprise identifying a type of transaction and searching for the type of transaction within the term of the instrument.

18. The non-transitory computer-readable medium of claim 11, wherein the operations further comprise retrieving the rule from a memory system and transmitting the rule to the rule interpreter.

19. A computer-implemented method comprising:

identifying, by a processor, an instrument remotely associated with the processor from a pipeline of data received by the processor;

receiving, from at least one database computing device, a data structure associated with the instrument, the data structure comprising a first state of the instrument and a first and second data entry associated with the instrument, wherein the first state of the instrument comprises a term of the instrument, wherein the first state is stored in a database memory of the at least one database computing device;

executing a transaction interpreter by the processor, by inputting the data structure into the transaction interpreter;

determining, by the processor executing the transaction interpreter, a transaction type of the instrument;

altering, by the processor executing the transaction interpreter, the first state of the instrument to a second state of the instrument in the data structure based at least on one of the transaction type or the term;

executing a rollup interpreter by the processor, by inputting the data structure into the rollup interpreter, the data structure comprising the second state of the instrument;

aggregating, by the processor executing the rollup interpreter, the first and the second data entry of the data structure to create a third state of the instrument;

altering, by the processor executing the rollup interpreter, the second state of the instrument to the third state of the instrument in the data structure;

executing a rule interpreter by the processor, by inputting the data structure into the rule interpreter, the data structure comprising the third state of the instrument;

identifying, by the processor executing the rule interpreter, a rule based on the term of the instrument;

applying, by the processor executing rule interpreter, the rule on the third state of the instrument to create a fourth state of the instrument in the data structure; and sending, by the processor, to the at least one database computing device, the data structure comprising the fourth state of the instrument.

20. The computer-implemented method of claim 19, wherein the first state comprises an original balance of a financial instrument.

\* \* \* \* \*